United States Patent
Satou et al.

(10) Patent No.: US 6,890,494 B2
(45) Date of Patent: May 10, 2005

(54) METHOD FOR POLYMERIZATION OF OLEFIN

(75) Inventors: Hideki Satou, Ichihara (JP); Youichi Matsuo, Ichihara (JP); Itaru Matsuhiro, Ichihara (JP)

(73) Assignee: Idemitsu Petrochemical Co., Ltd., Tokyo (JP)

(*) Notice: Subject to any disclaimer, the term of this patent is extended or adjusted under 35 U.S.C. 154(b) by 788 days.

(21) Appl. No.: 09/818,915

(22) Filed: Mar. 28, 2001

(65) Prior Publication Data

US 2001/0019706 A1 Sep. 6, 2001

Related U.S. Application Data

(62) Division of application No. 09/353,835, filed on Jul. 15, 1999, now Pat. No. 6,271,318.

(51) Int. Cl.$^7$ .................... B32B 27/04; B32B 27/12; B32B 5/02
(52) U.S. Cl. .................................... 422/131
(58) Field of Search ................ 422/131, 140, 422/145, 146, 147

(56) References Cited

U.S. PATENT DOCUMENTS

| 5,541,270 A | * | 7/1996 | Chinh et al. ............... 526/68 |
| 5,556,820 A | * | 9/1996 | Funabashi et al. .......... 502/111 |
| 5,728,353 A | | 3/1998 | Govoni et al. |

* cited by examiner

Primary Examiner—M. Alexandra Elve
(74) Attorney, Agent, or Firm—Oblon, Spivak, McClelland, Maier & Neustadt, P.C.

(57) ABSTRACT

The present invention is directed to a method for polymerizing olefins in a multi-stage polymerization apparatus including a gas-phase polymerization reactor in a subsequent stage. By use of the present method, the composition of gas in the gas-phase reactor is easily adjusted, and moreover, a polymer having an intended composition is produced in a consistent manner. In one aspect, the method for polymerizing olefins is performed in successive, multiple stages by use of a plurality of polymerization reactors disposed in series which include at least one gas-phase polymerization reactor after a first reactor, wherein a multi-component gas is removed from a gas-phase reactor and pressurized and/or cooled to thereby liquefy a portion of the gas; at least a portion of gas is discharged; and the remaining gas and the liquid are returned to the gas-phase reactor.

8 Claims, 1 Drawing Sheet

METHOD FOR POLYMERIZATION OF OLEFIN

BACKGROUND OF THE INVENTION

1. Field of the Invention

The present invention relates to a method for polymerizing olefins such as ethylene and propylene, and more particularly to a method for polymerizing olefins in a multi-stage polymerization apparatus comprising a gas-phase polymerization reactor in which the composition of gas is easily controlled.

2. Background Art

Among a variety of industrial methods for polymerizing olefins such as ethylene and propylene, a gas-phase polymerization method has become of interest. This method utilizes high-activity catalyst and does not require a deashing (removal of catalyst residue) process.

However, in the case of a successive multi-stage gas-phase polymerization method, the composition of gas in a polymerization reactor of a certain stage affects the composition of gas in a polymerization reactor of a subsequent stage. Therefore, adjustment of the composition of gas in the reactor of a subsequent stage may be difficult.

For example, in order to produce a polymer having a broad molecular weight distribution, usually a low molecular weight polymer is produced in a reactor of a certain stage, and in a reactor of a subsequent stage the resultant polymer is further polymerized to yield a higher polymer. In this case, in the preceding polymerization, hydrogen gas of high concentration is used as a chain-transfer agent. However, since hydrogen gas of low concentration is used in the subsequent polymerization, when the polymer is transferred from a preceding reactor to a subsequent reactor there must be removed a large amount of hydrogen gas accompanying a produced polymer.

In addition, when a copolymer such as ethylene-propylene is to be produced, the composition of gas in each polymerization reactor must be adjusted.

Therefore, several methods have been proposed for adjusting the composition of gas in a gas-phase polymerization reactor of a subsequent stage. Japanese Patent Application Laid-Open (kokai) No. 23001/1984 discloses a method in which a purge vessel is provided between two sequential polymerization reactors for adjusting the concentration of hydrogen gas (a chain-transfer agent) contained in an accompanying gas including a polymer fed from a preceding polymerization reactor, wherein the accompanying gas is removed and only the polymer is transferred to a subsequent reactor. Also, Japanese Patent Application Laid-Open (kokai) No. 65703/1982 discloses a method in which an accompanying gas containing a polymer is diluted with inert gas in a purge vessel, to thereby transfer to a subsequent reactor the polymer accompanied by hydrogen gas of low concentration. Furthermore, Japanese Patent Application Laid-Open (kokai) No. 118342/1995 discloses a method in which a purge vessel is formed of a tank for gas and a tank for powder, and an accompanying gas containing a polymer is removed by operation of a valve between the two tanks, and then the polymer in the tank for powder is transferred to a subsequent polymerization reactor by use of pressurized circulating gas from the subsequent reactor. However, these methods still have drawbacks, such as requirement of a purge vessel and complicated valve control operation.

SUMMARY OF THE INVENTION

The present inventors have performed extensive studies in an attempt to solve the above-described drawbacks, and have found that it is possible to adjust the composition of gas and to control temperature, i.e., removal of heat of polymerization, in a gas-phase polymerization reactor by removing gas from a subsequent gas-phase polymerization reactor; pressurizing and cooling the gas to partially liquefy the gas; discharging at least a portion of the gas; and returning the remaining gas and the liquid to the reactor. Based on this finding, the inventors have accomplished the present invention.

Accordingly, an object of the present invention is to provide a method for polymerizing olefins in a multi-stage polymerization apparatus comprising a gas-phase polymerization reactor in a subsequent stage, wherein the composition of gas in the gas-phase reactor is easily adjusted, and whereby a polymer having an intended composition is produced in a continuous process.

In a first aspect of the present invention, there is provided a method for polymerizing olefins in successive, multiple stages by use of a plurality of polymerization reactors disposed in series comprising at least one gas-phase polymerization reactor after a first reactor, wherein a multi-component gas is removed from a gas-phase reactor and pressurized and/or cooled to thereby liquefy a portion of the gas; at least a portion of the removed gas is discharged; and the remaining gas and the liquid are returned to the gas-phase reactor.

In a second aspect of the present invention, there is provided a method for polymerizing olefins in successive multi-stages by use of a plurality of polymerization reactors disposed in series comprising at least one gas-phase polymerization reactor after a first reactor, wherein a multi-component gas is removed from a gas-phase reactor and pressurized and/or cooled to thereby liquefy a portion of the gas; the liquid is returned to the gas-phase reactor; the remaining gas is further pressurized and/or cooled to thereby liquefy a portion of the gas; at least a portion of the gas is discharged; and the remaining gas and the liquid are returned to the gas-phase reactor.

DETAILED DESCRIPTION OF PREFERRED EMBODIMENTS

Figure 1:
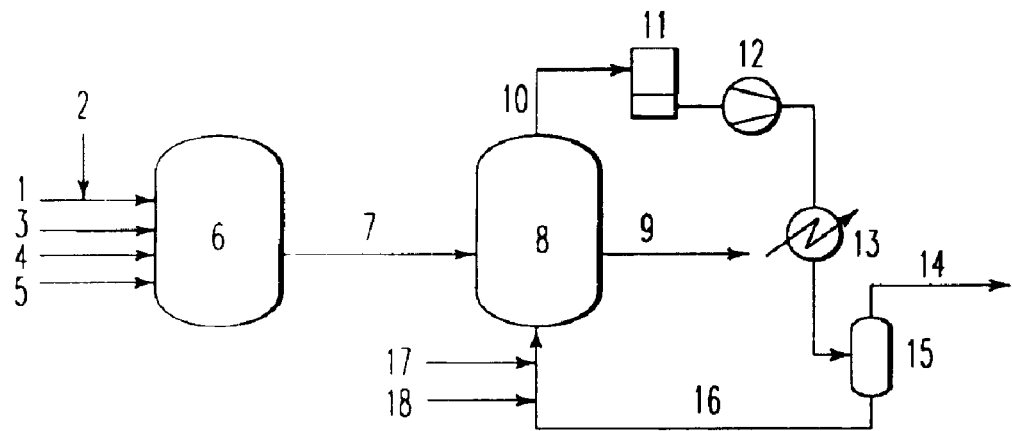
FIG. 1 is a process flowchart showing one example according to the present invention, in which light gas is separated from a multi-component gas in a polymerization reactor in a single stage.

Modes of the present invention will next be described.

A. Method of Successive Multi-Stage Polymerization Covered by the Scope of the Invention The method for polymerizing olefins of the present invention is applied to homopolymerization or copolymerization of olefins such as ethylene, propylene, butene-1, pentene-1, hexene-1, octene-1, and 4-methylpentene-1. Also, the method is applied to copolymerization between olefins and another monomer.

In the method for polymerizing olefins of the present invention, polymerization catalysts are typically used. For example, among all types of catalysts used for polymerization of olefins, a customary Ziegler solid catalyst is preferably used.

A typical Ziegler solid catalyst comprises a titanium compound, an organoaluminum compound, and an electron donor. Examples of the titanium compound include titanium halides such as titanium tetrachloride, titanium tetrabromide, and titanium tetraiodide. Examples of the organoaluminum compound include alkylaluminums such as trimethylaluminum and triethylaluminum. Examples of the electron donor include organosilane compounds such as tetraethoxysilane, diphenyldimethoxysilane, and dicyclopentyldimethoxysilane. In the present invention, the electron donor is used in order to adjust the stereoregularity, the molecular weight, and the molecular weight distribution of a polymer.

The present invention provides a method of successive multi-stage polymerization by use of a plurality of polymerization reactors (usually about 2–10 reactors) disposed in series and comprising at least one gas-phase polymerization reactor after the first reactor. In other words, a polymerization apparatus comprising gas-phase polymerization reactor in multiple stages, or a polymerization apparatus comprising a combination of gas-phase and liquid-phase polymerization reactors in multiple stages is satisfactory for carrying out the polymerization method of the present invention, so long as at least one reactor after the first reactor is a gas-phase polymerization reactor.

As used herein, the term "gas-phase polymerization reactor" refers generally to a polymerization reactor for allowing polymerization of a monomer gas containing a catalyst in gas phase, wherein a produced polymer and a monomer coexist. Various types of gas-phase polymerization reactors are available, and typical examples thereof include an agitation-type gas-phase polymerization reactor and a fluidized bed gas-phase polymerization reactor.

The term "liquid-phase polymerization reactor" refers generally to a polymerization reactor for allowing polymerization of a monomer in liquid phase, wherein a monomer is liquefied solely or with a solvent (e.g. paraffin such as n-heptane or hexane), and wherein a preliminary polymerized polymer containing a catalyst exists in slurry form in a liquid phase. Available types of liquid-phase polymerization reactors include a loop-type bulk polymerization reactor and an agitation-type slurry polymerization reactor.

In a polymerization apparatus in which gas-phase and liquid-phase polymerization reactors are used in combination, the two types of reactors differ in terms of the phases of materials contained therein, and a vaporizing apparatus or a liquefying apparatus must be provided between a gas-phase polymerization reactor and a liquid-phase polymerization reactor in order to perform phase conversion.

Examples of the sequence of polymerization reactors employed in the method of polymerization of the present invention are described below for the cases of two-stage, three-stage, and four-or-more-stage polymerization. As used herein, "gas" refers to a gas-phase polymerization reactor, and "liquid" refers to a liquid-phase polymerization reactor, and "–" refers to a connection between reactors.

(1) Two-stage Polymerization
  gas-gas, liquid-gas
(2) Three-stage Polymerization
  gas-gas-gas, liquid-gas-gas, gas-liquid-gas, liquid-liquid-gas, gas-gas-liquid, liquid-gas-liquid
(3) Four-or-more-stage Polymerization
  A sequence for a four-or-more-stage polymerization is obtained by attaching "gas" or "liquid" to the last stage of a sequence for polymerization 1 order lower. For example, in the case of four-stage polymerization, "gas" or "liquid" is attached to the last stage of a sequence listed above for three-stage polymerization, and in the case of seven-stage polymerization, "gas" or "liquid" is attached to the last stage of a sequence employed for six-stage polymerization.

B. Method for Adjusting the Composition of Gas in a Gas-phase Polymerization Reactor As described above, the present invention is directed to a method of performing successive multi-stage polymerization of olefins by use of a plurality of polymerization reactors disposed in series and comprising at least one gas-phase polymerization reactor after the first reactor. In a gas-phase polymerization reactor, the composition of gas must be adjusted in order to adjust the molecular weight distribution of a polymer and to control the polymerization proportions of a plurality of monomers and the molecular weight of a polymer. The present invention provides a method for adjusting the composition of gas easily in a gas-phase polymerization reactor, even when the composition of gas from the preceding polymerization reactor is not preferable for the gas-phase reactor.

The present invention provides a method for adjusting the composition of gas in a gas-phase polymerization reactor, wherein gas is removed from the reactor and the gas is pressurized and/or cooled to liquefy a portion of the gas (mainly heavy gas components), to thereby isolate light gas, and at least a portion of the light gas is discharged. More specifically, the present invention provides a method for isolating light gas in a single stage and a method for isolating light gas in two stages.

(1) Method for Isolating, in a Single Stage, Light Gas from the Gas in a Polymerization Reactor The first aspect of the present invention is directed to a method of successive multi-stage polymerization of olefins by use of a plurality of polymerization reactors arranged in series and comprising at least one gas-phase polymerization reactor after the first reactor, wherein a multi-component gas is removed from the gas-phase polymerization reactor and is pressurized and/or cooled, to thereby liquefy a portion of the gas, and subsequently a portion of the gas is discharged and the remaining gas and the liquid are returned to the reactor.

In the present invention, when a gas removed from a gas-phase polymerization reactor is a multi-component gas, it means that the gas contains multi-component monomers, or a monomer and hydrogen which serves as a chain-transfer agent. When the multi-component gas is liquefied, a heavier gas component is preferentially liquefied, and light gas components are included in the remaining gas at high content. Therefore, the gas in the polymerization reactor can be made to contain heavier components as a result of a portion of the remaining gas being discharged and another portion of the remaining gas and the liquid being returned to the reactor. Hereinafter, light gas components may be collectively referred to as light gas, and similarly, heavy gas components may be collectively referred to as heavy gas.

Regardless of the type of reactor; i.e., an agitation-type gas-phase polymerization reactor or a fluidized bed polymerization reactor, gas is preferably removed from the upper portion of the reactor, because in the reactor, gas is usually present in upper 20–30% of the volume of the reactor and polymerized powder in a lower portion.

Gas removed from a gas-phase polymerization reactor is liquefied partially, and subsequently the liquid is returned to the reactor and vaporized therein. Therefore, the latent heat of vaporization may be used for removal of the heat of reaction generated in the reactor. Thus, the present invention enables adjustment of the composition of gas in the reactor and control of reactor temperature.

The present invention is specifically described by reference to FIG. 1 showing a process flow.

In FIG. 1, the terms "first polymerization reactor" and "second polymerization reactor" respectively refer to the first and the second polymerization reactors among a plurality of polymerization reactors disposed in series, and in the case of neighboring reactors these terms refer to a preceding reactor and a subsequent reactor. For the sake of simplicity, the following description will be given of the case in which both a first polymerization reactor and a second polymerization reactor serve as gas-phase polymerization reactors.

Propylene (1), a catalyst (2), hydrogen (3) an organoaluminum compound (4), and an electron donor (5) are supplied to a first polymerization reactor (6), and propylene is subjected to homopolymerization. Subsequently, the polymerized powder and the accompanying gas are supplied to a second polymerization reactor (8) through a powder transfer line (7), and copolymerization of propylene-ethylene is subsequently performed in the second reactor (8). The powder produced in the second reactor (8) and the accompanying gas are removed from the reactor through a powder transfer line (9). Circulation gas (10), which is used in the second reactor (8) for cooling, is pressurized by use of a compressor (12) and cooled in a first heat exchanger (13), to thereby obtain a gas-liquid mixed-phase fluid. In a first separator (15), light gas is isolated from the gas-liquid mixed-phase fluid and discharged through a gas discharge line (14). Subsequently, the remaining component (first separator liquid (16)) is transferred to the second reactor (8) in order to remove the heat of reaction generated therein. Ethylene (17) and propylene (18), which are necessary for producing a copolymer in the second polymerization reactor (8), are supplied to the first separator liquid (16).

(2) Method of Isolating, in Two Stages, Light Gas from the Gas in a Polymerization Reactor The present invention is directed to a method of successive multi-stage polymerization of olefins by use of a plurality of polymerization reactors arranged in series and comprising at least one gas-phase polymerization reactor after the first reactor, wherein a multi-component gas is removed from the gas-phase polymerization reactor and pressurized and/or cooled, to thereby liquefy a portion of the gas, and subsequently the liquid is returned to the reactor and the remaining gas is further pressurized and/or cooled, to thereby liquefy a portion thereof, and at least a portion of the gas is discharged and the remaining gas and the liquid are returned to the reactor.

The method according to the second aspect of the invention is basically identical with that of the first aspect, but in the method of the second aspect, light gas is isolated in two stages from the gas contained in a polymerization reactor.

In other words, the second aspect of the present invention is directed to a method for discharging light gas at high performance, i.e., the content of light gas components is high in a discharged gas. This method is most practical, since it enables continuous operation by use of a few pieces of fixed equipment. Therefore, in order to more efficiently isolate light gas from a gas-liquid mixed-phase fluid, in accordance with needs there is employed three- or four-stage isolation, or a method for higher order isolation by use of a distillation column.

This mode of the present invention is specifically described by reference to FIG. 2, which shows a process flow.

Propylene (1), a catalyst (2), hydrogen (3) an organoaluminum compound (4), and an electron donor (5) are supplied to a first polymerization reactor (6), and the propylene is subjected to homopolymerization. Subsequently, the polymerized powder and an accompanying gas are supplied to a second polymerization reactor (8) through a powder transfer line (7), and copolymerization of propylene-ethylene is subsequently performed in the second reactor (8). The powder produced in the second reactor (8) and an accompanying gas are removed from the reactor through a powder transfer line (9). Circulation gas (10), which is used in the second reactor (8) for cooling, is pressurized by use of a compressor (12) and cooled in a first heat exchanger (13), to thereby obtain a gas-liquid mixed-phase fluid. In a first separator (15), gas (gas from a first separator (19)) is isolated from the gas-liquid mixed-phase fluid, and the remaining component (first separator liquid (16)) is returned to the second reactor in order to remove the heat of reaction generated therein. Gas from a first separator (19) is further cooled in a second heat exchanger (20), to thereby obtain a gas-liquid mixed phase fluid. In a second separator (21), gas is isolated from the gas-liquid mixed phase fluid and discharged through a gas discharge line (14). Subsequently, the remaining component (second separator liquid (22)) is returned to the second reactor (8) in order to remove the heat of reaction generated therein. Ethylene (17) and propylene (18), which are necessary for producing a copolymer in the second polymerization reactor (8), are supplied to the second separator liquid (22).

C. Application Examples of the Present Invention

Application examples of the method for polymerizing olefins of the present invention are described below.

1) Applications of Two-stage Polymerization

Case 1. A propylene homopolymer having a low molecular weight is produced in the first polymerization reactor, and a propylene homopolymer having a high molecular weight is produced in the second polymerization reactor. A gas component is discharged through a gas discharge line, wherein the concentration of hydrogen in the component is higher than that in a gas component contained in the second polymerization reactor.

Case 2. An ethylene homopolymer having a low molecular weight is produced in the first polymerization reactor, and an ethylene homopolymer having a high molecular weight is produced in the second polymerization reactor. A gas component is discharged through a gas discharge line, wherein the concentration of hydrogen in the component is higher than that in a gas component contained in the second polymerization reactor.

Case 3. A propylene homopolymer having a low molecular weight is produced in the first polymerization reactor, and a propylene-ethylene copolymer having a high molecular weight is produced in the second polymerization reactor. A gas component is discharged through a gas discharge line, wherein the concentration of hydrogen in the component is higher than that in a gas component contained in the second polymerization reactor.

Case 4. An ethylene homopolymer having a low molecular weight is produced in the first polymerization reactor, and a propylene-ethylene copolymer having a high molecular weight is produced in the second polymerization reactor. A gas component is discharged through a gas discharge line, wherein the concentration of hydrogen in the component is higher than that in a gas component contained in the second polymerization reactor.

Case 5. A propylene homopolymer is produced in the first polymerization reactor, and a propylene-1-butene copolymer is produced in the second polymerization reactor. A gas component is discharged through a gas discharge line, wherein the concentration of propylene in the component is higher than that in a gas component contained in the second polymerization reactor.

Case 6. An ethylene homopolymer is produced in the first polymerization reactor, and an ethylene-propylene copolymer is produced in the second polymerization reactor. A gas component is discharged through a gas discharge line, wherein the concentration of ethylene in the component is higher than that in a gas component contained in the second polymerization reactor.

Case 7. An ethylene homopolymer is produced in the first polymerization reactor, and an ethylene-1-hexene copolymer is produced in the second polymerization reactor. A gas component is discharged through a gas discharge line, wherein the concentration of ethylene in the component is higher than that in a gas component contained in the second polymerization reactor.

Case 8. An ethylene-propylene copolymer having a low molecular weight is produced in the first polymerization reactor, and an ethylene-propylene copolymer having a high molecular weight is produced in the second polymerization reactor. A gas component is discharged through a gas discharge line, wherein the concentration of hydrogen in the component is higher than that in a gas component contained in the second polymerization reactor.

Case 9. An ethylene-propylene copolymer is produced in the first polymerization reactor, and in the second reactor there is produced an ethylene-propylene copolymer having a higher content of propylene as compared with the copolymer produced in the first polymerization reactor. A gas component is discharged through a gas discharge line, wherein the concentration of ethylene in the component is higher than that in a gas component contained in the second polymerization reactor.

These methods are applied to the case where the gas and/or the liquid accompanying a polymer produced in the first polymerization reactor are supplied to the second polymerization reactor, wherein a relatively light component in the second reactor is supplied to the second reactor excessively.

2) Applications of Three-stage Polymerization

Case 1. A propylene homopolymer having a low molecular weight is produced in the first polymerization reactor; a propylene homopolymer having a high molecular weight is produced in the second polymerization reactor; and a propylene homopolymer having a higher molecular weight as compared with the homopolymer produced in the second reactor is produced in the third polymerization reactor. A gas component is discharged through a gas discharge line of a circulation system of the second polymerization reactor, wherein the concentration of hydrogen in the component is higher than that in a gas component contained in the second polymerization reactor. A gas component is discharged through a gas discharge line of a circulation system of the third polymerization reactor, wherein the concentration of hydrogen in the component is higher than that in a gas component contained in the third polymerization reactor.

Case 2. An ethylene homopolymer having a low molecular weight is produced in the first polymerization reactor; an ethylene homopolymer having a high molecular weight is produced in the second polymerization reactor; and an ethylene homopolymer of higher molecular weight as compared with the homopolymer produced in the second reactor is produced in the third polymerization reactor. A gas component is discharged through a gas discharge line of a circulation system of the second polymerization reactor, wherein the concentration of hydrogen in the component is higher than that in a gas component contained in the second polymerization reactor. A gas component is discharged through a gas discharge line of a circulation system of the third polymerization reactor, wherein the concentration of hydrogen in the component is higher than that in a gas component contained in the third polymerization reactor.

Case 3. A propylene homopolymer having a low molecular weight is produced in the first polymerization reactor; a propylene homopolymer having a high molecular weight is produced in the second polymerization reactor; and an ethylene-propylene copolymer is produced in the third polymerization reactor. A gas component is discharged through a gas discharge line of a circulation system of the second polymerization reactor, wherein the concentration of hydrogen in the component is higher than that in a gas component contained in the second polymerization reactor. A gas component is discharged through a gas discharge line of a circulation system of the third polymerization reactor, wherein the concentration of hydrogen in the component is higher than that in a gas component contained in the third polymerization reactor.

Case 4. An ethylene homopolymer having a low molecular weight is produced in the first polymerization reactor; an ethylene homopolymer having a high molecular weight is produced in the second polymerization reactor; and an ethylene-propylene copolymer is produced in the third polymerization reactor. A gas component is discharged through a gas discharge line of a circulation system of the second polymerization reactor, wherein the concentration of hydrogen in the component is higher than that in a gas component contained in the second polymerization reactor. A gas component is discharged through a gas discharge line of a circulation system of the third polymerization reactor, wherein the concentration of ethylene in the component is higher than that in a gas component contained in the third polymerization reactor.

Case 5. A propylene homopolymer having a low molecular weight is produced in the first polymerization reactor; a propylene homopolymer having a high molecular weight is produced in the second polymerization reactor; and a propylene-1-butene copolymer is produced in the third polymerization reactor. A gas component is discharged through a gas discharge line of a circulation system of the second polymerization reactor, wherein the concentration of hydrogen in the component is higher than that in a gas component contained in the second polymerization reactor. A gas component is discharged through a gas discharge line of a circulation system of the third polymerization reactor, wherein the concentration of propylene in the component is higher than that in a gas component contained in the third polymerization reactor.

Case 6. A propylene homopolymer having a low molecular weight is produced in the first polymerization reactor; a propylene homopolymer having a high molecular weight is produced in the second polymerization reactor; and a propylene-1-butene copolymer is produced in the third polymerization reactor. A gas component is discharged through a gas discharge line of a circulation system of the second polymerization reactor, wherein the concentration of hydrogen in the component is higher than that in a gas component contained in the second polymerization reactor. A gas component is discharged through a gas discharge line of a circulation system of the third polymerization reactor, wherein the concentration of hydrogen in the component is higher than that in a gas component contained in the third polymerization reactor.

Case 7. A propylene homopolymer is produced in the first polymerization reactor; an ethylene-propylene copolymer is produced in the second polymerization reactor; and an ethylene-propylene copolymer having a higher content of propylene as compared with the copolymer produced in the second reactor is produced in the third polymerization reactor. A gas component is discharged through a gas discharge line of a circulation system of the second polymerization reactor, wherein the concentration of hydrogen in the component is higher than that in a gas component contained in the second polymerization reactor. A gas component is discharged through a gas discharge line of a circulation system of the third polymerization reactor, wherein the concentration of ethylene in the component is higher than that in a gas component contained in the third polymerization reactor.

Case 8. An ethylene homopolymer is produced in the first polymerization reactor; an ethylene-propylene copolymer is produced in the second polymerization reactor; and an ethylene-propylene copolymer having a higher content of propylene as compared with the copolymer produced in the second reactor is produced in the third polymerization reactor. A gas component is discharged through a gas discharge line of a circulation system of the second polymerization reactor, wherein the concentration of hydrogen in the component is higher than that in a gas component contained in the second polymerization reactor. A gas component is discharged through a gas discharge line of a circulation system of the third polymerization reactor, wherein the concentration of ethylene in the component is higher than that in a gas component contained in the third polymerization reactor.

Case 9. An ethylene homopolymer is produced in the first polymerization reactor; an ethylene-propylene copolymer is produced in the second polymerization reactor; and an ethylene-propylene copolymer having a higher content of propylene as compared with the copolymer produced in the second reactor is produced in the third polymerization reactor. A gas component is discharged through a gas discharge line of a circulation system of the second polymerization reactor, wherein the concentration of ethylene in the component is higher than that in a gas component contained in the second polymerization reactor. A gas component is discharged through a gas discharge line of a circulation system of the third polymerization reactor, wherein the concentration of ethylene in the component is higher than that in a gas component contained in the third polymerization reactor.

Case 10. An ethylene homopolymer is produced in the first polymerization reactor; an ethylene-1-hexene copolymer is produced in the second polymerization reactor; and an ethylene-1-hexene copolymer having a higher content of 1-hexene as compared with the copolymer produced in the second reactor is produced in the third polymerization reactor. A gas component is discharged through a gas discharge line of a circulation system of the second polymerization reactor, wherein the concentration of hydrogen in the component is higher than that in a gas component contained in the second polymerization reactor. A gas component is discharged through a gas discharge line of a circulation system of the third polymerization reactor, wherein the concentration of ethylene in the component is higher than that in a gas component contained in the third polymerization reactor.

Case 11. An ethylene homopolymer is produced in the first polymerization reactor; an ethylene-1-hexene copolymer is produced in the second polymerization reactor; and an ethylene-1-hexene copolymer having a higher content of 1-hexene as compared with the copolymer produced in the second reactor is produced in the third polymerization reactor. A gas component is discharged through a gas discharge line of a circulation system of the second polymerization reactor, wherein the concentration of ethylene in the component is higher than that in a gas component contained in the second polymerization reactor. A gas component is discharged through a gas discharge line of a circulation system of the third polymerization reactor, wherein the concentration of ethylene in the component is higher than that in a gas component contained in the third polymerization reactor.

These methods are applied to the case where the gas and/or the liquid accompanying a polymer produced in the first polymerization reactor are supplied to the second polymerization reactor, wherein a relatively light component of the gas and/or the liquid in the second reactor are supplied to the second reactor excessively, and furthermore, the gas and/or the liquid accompanying a polymer produced in the second polymerization reactor are supplied to the third polymerization reactor, wherein a relatively light component of the gas and/or the liquid in the third reactor are supplied to the third reactor excessively.

EXAMPLES

The present invention will next be described in more detail by way of examples.

Example 1

In an apparatus as shown in FIG. 1, a propylene homopolymer having a low molecular weight was produced in a first polymerization reactor (6), and a propylene-ethylene copolymer having a high molecular weight was produced in a second polymerization reactor (8), to thereby obtain a propylene-ethylene copolymer having a high limiting viscosity ($\eta$) corresponding to the copolymerization portion. In this apparatus, polymerization reactors (volume: 200 liters) were used. A titanium-tetrachloride-on-magnesium catalyst was supplied to a first polymerization reactor (6) through a catalyst supply line (2) at a rate of about 0.04 g (as reduced to titanium)/hr, and also, propylene was supplied to the first reactor (6) at a rate of 37.5 kg/hr. Triethylaluminum serving as an organoaluminum compound catalyst and dicyclopentyldimethoxysilane serving as an electron donor catalyst were supplied to the first reactor (6) through catalyst supply lines (4) and (5), respectively. When these catalysts were supplied, the mol ratio of triethylaluminum to dicyclopentyldimethoxysilane was 4:1. In addition, hydrogen gas serving as a chain-transfer agent was supplied to the first reactor (6) through a supply line (3) at a rate of 1800 liters/hr.

In the first polymerization reactor (6), polymerization was performed at 30 kg/cm$^2$·G and 80° C. The produced polymer powder and the accompanying gas were transferred to a second polymerization reactor (8) through a transfer line (7). In the second reactor (8), polymerization was performed at 16.0 kg/cm$^2$·G and 60° C. In order to produce a copolymer, ethylene was supplied to the second reactor (8) at a rate of 5.1 kg/hr without supply of catalysts. By use of a compressor (12), the pressure of a circulation gas was raised up to 19.7 kg/cm$^2$·G. A first heat exchanger (13) was controlled so as to adjust the temperature in a first separator (15) to −20° C., and gas was discharged through a gas discharge line (14) at a rate of 1.02 kg/hr. In the first polymerization reactor, the mole fraction of hydrogen was 8.9%, and in the second polymerization reactor, the mole fractions of hydrogen and ethylene were 2.0% and 40.1%, respectively. Through this two-stage polymerization, in the second polymerization reactor a propylene-ethylene copolymer containing 45% ethylene in the copolymerization portion was produced at a rate of 35.3 kg/hr. In the produced copolymer, limiting viscosity (η) of the homopolymerization portion was 1.1 dl/g and that of the copolymerization portion was 4.5 dl/g.

The results are shown in Table 1.

Herein, limiting viscosity (η: dl/g) was measured in decalin at 135° C.

Example 2

Figure 2:
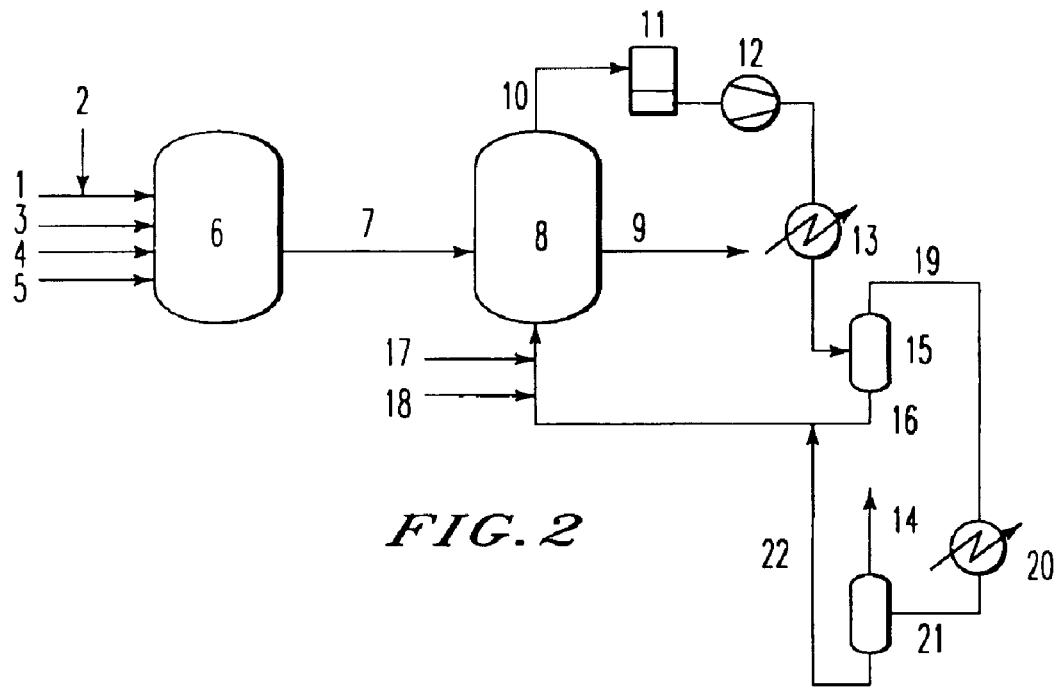
FIG. 2 is a process flowchart showing an example of the present invention, in which light gas is separated from a multi-component gas in a polymerization reactor in two stages.

In an apparatus as shown in FIG. 2, a propylene homopolymer having a low molecular weight was produced in a first polymerization reactor (6), and a propylene-ethylene copolymer having a high molecular weight was produced in a second polymerization reactor (8), to thereby obtain a propylene-ethylene copolymer having a high limiting viscosity (η) corresponding to the copolymerization portion. As shown in FIG. 2, polymerization reactors (volume: 200 liters) were used. A titanium tetrachloride-on-magnesium catalyst was supplied to a first polymerization reactor (6) through a catalyst supply line (2) at a rate of about 0.04 g (as reduced to titanium)/hr, and also, propylene was supplied to the first reactor (6) at a rate of 37.5 kg/hr. Triethylaluminum serving as an organoaluminum compound catalyst and dicyclopentyldimethoxysilane serving as an electron donor catalyst were supplied to the first reactor (6) through catalyst supply lines (4) and (5), respectively. When these catalysts were supplied, the mol ratio of triethylaluminum to dicyclopentyldimethoxysilane was 4:1. In addition, hydrogen gas serving as a chain-transfer agent was supplied to the first reactor (6) through a supply line (3) at a rate of 1800 liters/hr.

In the first polymerization reactor (6), polymerization was performed at 30 kg/cm$^2$·G and 80° C. The produced polymer powder and the accompanying gas were transferred to a second polymerization reactor (8) through a transfer line (7). In the second reactor (8), polymerization was performed at 16.0 kg/cm$^2$·G and 60° C. In order to produce a copolymer, ethylene was supplied to the second reactor (8) at a rate of 8.0 kg/hr without supply of catalysts. By use of a compressor (12), the pressure of a circulation gas was raised up to 19.7 kg/cm$^2$·G. A first heat exchanger (13) was controlled so as to adjust the temperature in a first separator (15) to 10° C., and a second heat exchanger (20) was controlled so as to adjust the temperature in a second separator (21) to –10° C. Gas was discharged through a gas discharge line (14) at a rate of 5.74 kg/hr. In the first polymerization reactor (6), the mole fraction of hydrogen was 9.0%, and in the second polymerization reactor (8), the mole fractions of hydrogen and ethylene were 1.3% and 40.0%, respectively. Through this two-stage polymerization, in the second polymerization reactor a propylene-ethylene copolymer containing 45% ethylene in the copolymerization portion was produced at a rate of 35.5 kg/hr. In the produced copolymer, limiting viscosity (η) of the homopolymerization portion was 1.1 dl/g and that of the copolymerization portion was 5.1 dl/g.

The results are shown in Table 1.

Comparative Example 1

In an apparatus as shown in FIG. 1, a propylene homopolymer having a low molecular weight was produced in a first polymerization reactor (6), and a propylene-ethylene copolymer having a high molecular weight was produced in a second polymerization reactor (8), to thereby obtain a propylene-ethylene copolymer having a high limiting viscosity (η) corresponding to the copolymerization portion. As shown in FIG. 1, polymerization reactors (volume: 200 liters) were used. A titanium tetrachloride-on-magnesium catalyst was supplied to the first polymerization reactor (6) through a catalyst supply line (2) at a rate of about 0.04 g (as reduced to titanium)/hr, and also, propylene was supplied to the first reactor (6) at a rate of 37.5 kg/hr.

Triethylaluminum serving as an organoaluminum compound catalyst and dicyclopentyldimethoxysilane serving as an electron donor catalyst were supplied to the first reactor (6) through the catalyst supply lines (4) and (5), respectively. When these catalysts were supplied, the mol ratio of triethylaluminum to dicyclopentyldimethoxysilane was 4:1. In addition, hydrogen gas serving as a chain-transfer agent was supplied to the first reactor (6) through a supply line (3) at a rate of 1800 liters/hr.

In the first polymerization reactor (6), polymerization was performed at 30 kg/cm$^2$·G and 80° C. The produced polymer powder and the accompanying gas were transferred to the second polymerization reactor (8) through a transfer line (7). In the second reactor (8), polymerization was performed at 16.0 kg/cm$^2$·G and 60° C. In order to produce a copolymer, ethylene was supplied to the second reactor (8) at a rate of 4.8 kg/hr without supply of catalysts. By use of a compressor (12), the pressure of a circulation gas was raised to 19.7 kg/cm$^2$·G. A first heat exchanger (13) was controlled so as to adjust the temperature in a first separator (15) to –20° C. In this Example, gas was not discharged through a gas discharge line (14). In the first polymerization reactor (6), the mole fraction of hydrogen was 9.0%, and in the second polymerization reactor (8), the mole fractions of hydrogen and ethylene were 8.4% and 40.0%, respectively. Through this two-stage polymerization, a propylene-ethylene copolymer containing 45% ethylene in the copolymerization portion was produced at a rate of 35.3 kg/hr in the second polymerization reactor. In the produced copolymer, limiting viscosity (η) of the homopolymerization portion was 1.1 dl/g and that of the copolymerization portion was 2.5 dl/g. In this Example, regardless of no hydrogen being supplied to the second polymerization reactor (8), the concentration of hydrogen in the second reactor (8) was higher as compared with the cases in Examples 1 and 2, due to the effect of the concentration of hydrogen in the first polymerization reactor (6).

The results are shown in Table 1.

TABLE 1

|  | Example 1 | Example 2 | Comparative Example 1 |
|---|---|---|---|
| Concentration of hydrogen in a first polymerization reactor (mol %) | 8.9 | 9.0 | 9.0 |
| Concentration of hydrogen in a second polymerization reactor (mol %) | 2.0 | 1.3 | 8.4 |
| Concentration of ethylene in a second polymerization reactor (mol %) | 40.1 | 40.0 | 40.0 |
| Produced polymer: η of homopolymerization portion/ η of copolymerization portion | 1.1/4.5 | 1.1/5.1 | 1.1/2.5 |
| Concentration of ethylene at the copolymerization portion (mol %) | 45.0 | 45.0 | 45.0 |

\*\*\*

As described above, the present invention allows easy and consistent adjustment of the composition of gas in a gas-phase polymerization reactor, to thereby produce a polymer having an intended molecular weight distribution and composition ratio.

What is claimed is:

1. An apparatus for preparing a polymer from at least one olefin comprising:
   a first reactor connected in series to one or more reactors comprising at least one gas-phase reactor;
   at least one monomer feed line connected to said first reactor
   a powder transfer line connecting said first reactor to said one or more reactors;
   a compressor connected to said gas-phase reactor;
   a heat exchanger connected to said compressor;
   a gas/liquid separator connected to said heat exchanger;
   a gas discharge line connected to said gas/liquid separator; and
   a liquid transfer line connecting said gas/liquid separator to said gas-phase reactor,
   wherein each of said one or more reactors are connected in series with an additional powder transfer line.

2. An apparatus for preparing a polymer from at least one olefin comprising:
   a first reactor connected in series to one or more reactors comprising at least one gas-phase reactor;
   at least one monomer feed line connected to said first reactor
   a powder transfer line connecting said first reactor to said one or more reactors;
   a compressor connected to said gas-phase reactor;
   a first heat exchanger connected to said compressor;
   a first gas/liquid separator connected to said first heat exchanger;
   a first gas discharge line connecting said first gas/liquid separator to a second heat exchanger;
   a first liquid transfer line connecting said first gas/liquid separator to said gas-phase reactor;
   a second gas/liquid separator connected to said second heat exchanger;
   a second gas discharge line connected to said second gas/liquid separator; and
   a second liquid transfer line connecting said second gas/liquid separator to said gas-phase reactor,
   wherein each of said one or more reactors are connected in series with an additional powder transfer line.

3. The apparatus of claim 1, wherein said first reactor and said one or more reactors comprise 2 to 10 reactors.

4. The apparatus of claim 2, wherein said first reactor and said one or more reactors comprise 2 to 10 reactors.

5. The apparatus of claim 1, further comprising at least one catalyst feed line connected to said first reactor.

6. The apparatus of claim 2, further comprising at least one catalyst feed line connected to said first reactor.

7. The apparatus of claim 1, further comprising at least one additional monomer feed line connected to each of said one or more reactors.

8. The apparatus of claim 2, further comprising at least one additional monomer feed line connected to each of said one or more reactors.

* * * * *